United States Patent [19]

Hirao et al.

[11] Patent Number: 5,285,187
[45] Date of Patent: Feb. 8, 1994

[54] VEHICLE COLLISION DETECTING APPARATUS

[75] Inventors: Manabu Hirao; Masahiro Miyamori; Noriaki Kataoka, all of Osaka, Japan

[73] Assignee: NEC Corporation, Tokyo, Japan

[21] Appl. No.: 828,455

[22] Filed: Jan. 31, 1992

[30] Foreign Application Priority Data

Jan. 31, 1991 [JP] Japan ................................. 3-31736
Feb. 14, 1991 [JP] Japan ................................. 3-42535

[51] Int. Cl.$^5$ ............................................. B60Q 1/00
[52] U.S. Cl. ................................. 340/436; 340/429; 340/665; 340/669
[58] Field of Search ............... 340/429, 436, 566, 665, 340/669

[56] References Cited

U.S. PATENT DOCUMENTS

| | | | |
|---|---|---|---|
| 3,851,305 | 11/1974 | Baba et al. | 340/669 |
| 4,673,912 | 6/1987 | Kumasaka et al. | 340/665 |
| 4,950,915 | 8/1990 | Spies et al. | 340/669 |
| 4,968,963 | 11/1990 | Naiton et al. | 340/436 |
| 5,021,678 | 6/1991 | Diller | 340/669 |
| 5,065,322 | 11/1991 | Mazur et al. | 340/429 |

Primary Examiner—John K. Peng
Assistant Examiner—Nina Tong
Attorney, Agent, or Firm—Foley & Lardner

[57] ABSTRACT

A vehicle collision detecting apparatus includes an acceleration sensor detecting acceleration of a motorcar, a frequency filter extracting a signal in a predetermined frequency band from the acceleration signal, and a detector for detecting a collision in accordance with the extracted signal. The detector supplies a trigger pulse to an airbag driver circuit.

5 Claims, 13 Drawing Sheets

VEHICLE COLLISION DETECTING APPARATUS

FIELD OF THE INVENTION

This invention relates to a vehicle collision detecting apparatus, and more particularly to, a vehicle collision detecting apparatus used in an airbag system of a motorcar.

BACKGROUND OF THE INVENTION

Recently, an airbag system is introduced in a motorcar in order to reduce a shock of a collision to the human body. In such an airbag system, an airbag is inflated in response to a trigger signal supplied from a collision detecting apparatus.

A conventional vehicle collision detecting apparatus includes an acceleration sensor for detecting an acceleration of a motorcar, an integrator for integrating an acceleration in a predetermined range, and a comparator for comparing the integrated acceleration with a predetermined threshold value. The comparator supplies a trigger signal to an airbag driver circuit, when the integrated value is higher than the threshold value.

According to the conventional vehicle collision detecting apparatus, a collision of a vehicle is detected in accordance with the integrated acceleration indicating a minute change of a car velocity. However, a collision of a vehicle is not detected with a high precision, because the integrated acceleration includes much noise.

SUMMARY OF THE INVENTION

Accordingly, it is an object of the invention to provide a vehicle collision detecting apparatus in which a collision is detected with a high precision.

According to the invention, a vehicle collision detecting apparatus includes:

means for detecting acceleration of a vehicle;

means for extracting a component of at least one predetermined frequency from the output signal of the acceleration detecting means;

means for determining a collision in accordance with a level of the extracted component.

On the other hand, the collision may be determined by a waveform of the acceleration signal.

BRIEF DESCRIPTION OF THE DRAWINGS

The invention will be explained in more detail in conjunction with appended drawings; wherein.

DESCRIPTION OF THE PREFERRED EMBODIMENTS

Figure 1:
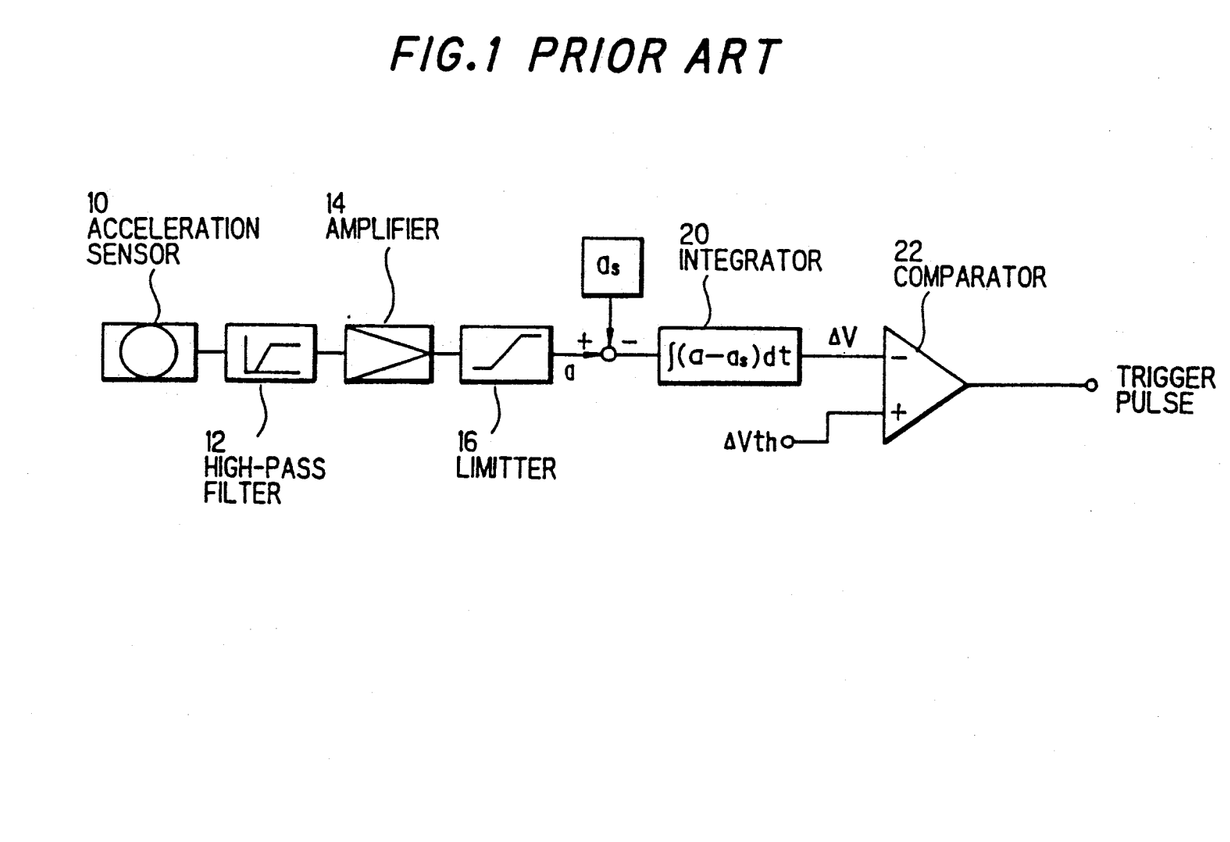
FIG. 1 is a block diagram showing a conventional vehicle collision detecting apparatus.

Before describing a vehicle collision detecting apparatus according to the invention, the briefly aforementioned conventional vehicle collision detecting apparatus will be explained in conjunction with FIG. 1. A conventional vehicle collision detecting apparatus includes an acceleration sensor 10 for detecting an acceleration of a motorcar, a high-pass filter 12 connected to the acceleration sensor 10, an amplifier 14 connected to the high-pass filter 12 for amplifying an acceleration signal, a limiter 16 connected to the amplifier 14 for limiting a frequency band of the acceleration signal, an integrator 20 for calculating an integrated signal $\Delta V$ in accordance with the below expression (1), and a comparator 22 for comparing the integrated signal $\Delta V$ with a predetermined threshold value $\Delta V_{1b}$.

$$\Delta V = \int (a - a_s) dt \tag{1}$$

In this expression, "a" is an output signal of the limiter 16, and "$a_s$" is an offset value which is a maximum acceleration on a normal driving condition.

The comparator supplies a trigger pulse to an airbag driving circuit (not shown) when the integrated signal $\Delta V$ is higher than the threshold value $\Delta V_{th}$.

According to the conventional vehicle collision detecting apparatus, a collision of a vehicle is detected in accordance with an integrated acceleration representing a minute change of a vehicle velocity. However, a collision of a vehicle is not detected with a high precision, because the integrated acceleration includes much noise.

Figure 2:
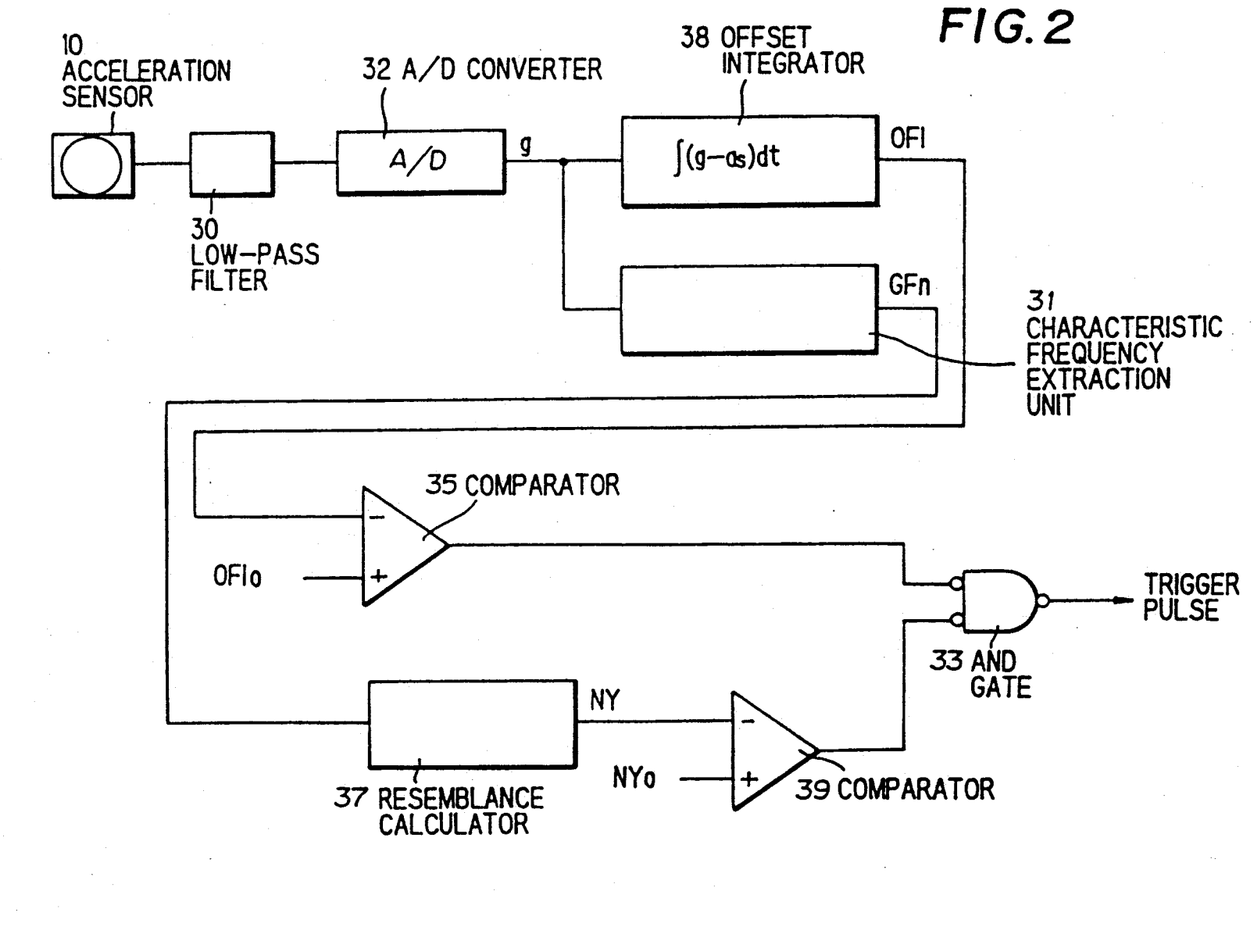
FIG. 2 is a block diagram showing a vehicle collision detecting apparatus of a first preferred embodiment according to the invention.

Next, a vehicle collision detecting apparatus of a first preferred embodiment according to the invention will be explained in conjunction with FIG. 2. A vehicle collision detecting apparatus includes an acceleration sensor 10 for detecting an acceleration of a motorcar, a low-pass filter 30 connected to the acceleration sensor 10, an analog to digital (A/D) converter 32 connected to the low-pass filter 30 for converting analog signal into digital signal "g", an offset integrator 38 having an offset value a, of −4 G for removing a noise, a characteristic frequency extraction unit 31 connected to the A/D converter 32 in parallel with the offset integrator 38, a comparator 35 connected at one of inputs to the offset integrator 38 for comparing the integrated signal OFI with a predetermined threshold value $OFI_0$, a resemblance calculator 37 connected to the characteristic frequency extraction unit 31, a comparator 39 connected at one of inputs to the resemblance calculator 37 for comparing a calculated signal NY of the calculator 37 with a predetermined threshold value $NY_0$, and an AND gate 33 of negative inputs and a negative output connected to outputs of the comparators 35 and 39.

The offset integrator 38 calculates the integrated signal OFI in accordance with the below expression (2).

$$OFI = \int (g - a_s) dt \tag{2}$$

The comparator 35 supplies an output signal to the AND gate 33, when the integrated signal OFI is higher than the threshold value $OFI_0$. The comparator 39 supplies an output signal to the AND gate 33, when the calculated signal NY is higher than the threshold value $NY_0$.

Figure 3:
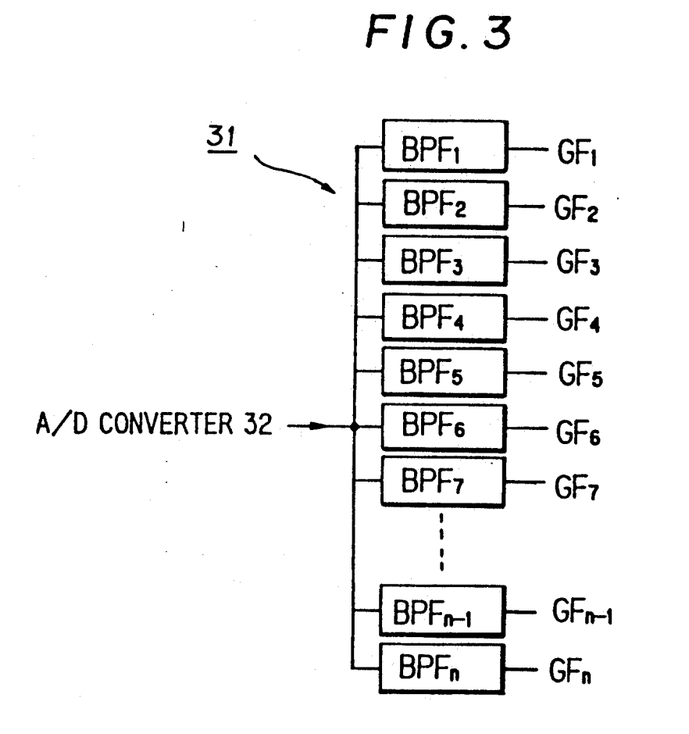
FIG. 3 is a block diagram showing an essential part of the first preferred embodiment.

FIG. 3 shows a structure of the characteristic frequency extraction unit 31. The characteristic frequency extraction unit 31 is composed of band pass filters $BPF_1$ to $BPF_n$ through which signals of only predetermined frequencies $f_1$ to $f_n$ are transmitted to supply output signals $GF_1$ to $GF_n$, respectively.

Figure 4:
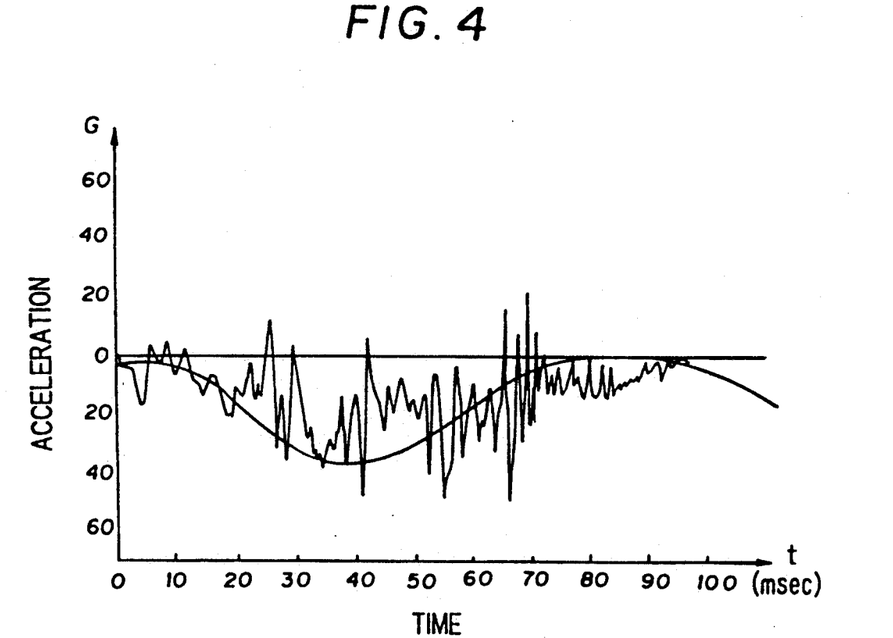
FIGS. 4 to 6 are graphs showing operation of the first preferred embodiment, respectively.
Figure 5:
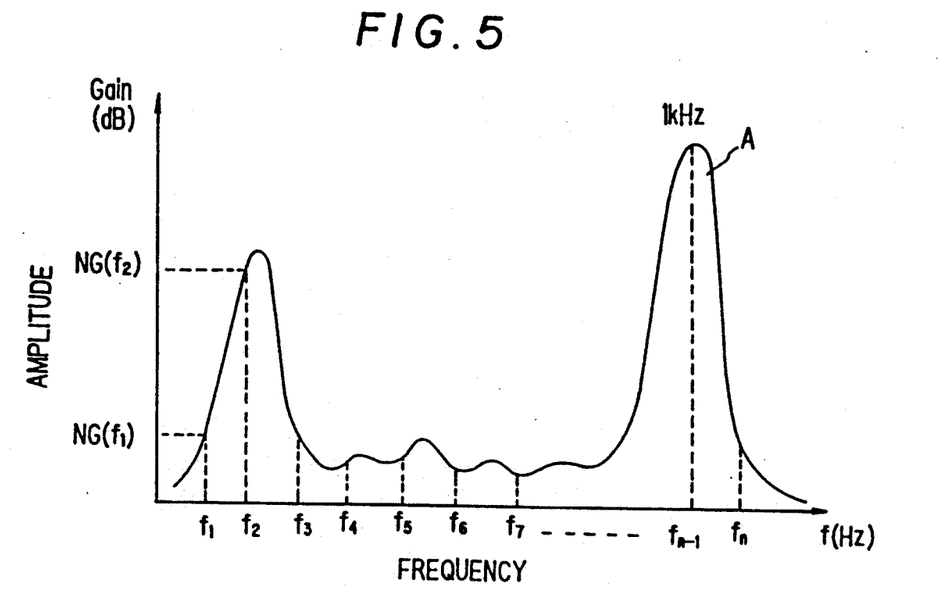
Figure 6:
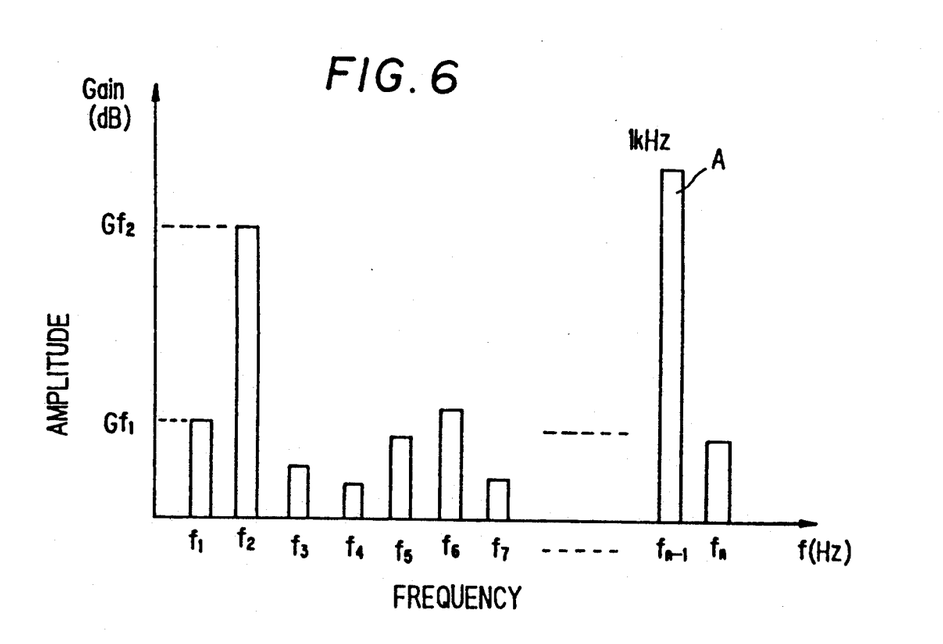

In operation, when a motorcar is driven, acceleration of the motorcar is detected by the acceleration sensor 10, and the detected signal "g" is supplied to the offset integrator 38 and the characteristic frequency extraction unit 31 through the low-pass filter 30 and the A/D converter 32, respectively. FIGS. 4 and 5 show a level of the detected acceleration relative to time and a spectrum (a relation between frequency and amplitude) of the acceleration signal, respectively. And, FIG. 6 shows a reference waveform which is stored in a memory for determining the waveform similarity at the time when a collision occurs.

Next, when the integrated signal OFI is higher than the threshold value $OFI_0$, an output signal is supplied from the comparator 35 to the AND gate 33. On the other hand, in the characteristic frequency extraction unit 31, characteristic frequencies of the acceleration signal "g" are extracted by the filter set $BPF_1$ to $BPF_4$ and the extracted signals $GF_1$ to $GF_n$ are supplied to the resemblance calculator 37. The resemblance calculator 37 calculates the resemblance coefficient signal NY in accordance with the extracted signals $GF_1$ to $GF_n$ based on the below expression (3).

$$NY = \sqrt{\{NG(f1) - Gf1\}^2 + \{NG(f2) - Gf2\}^2 \ldots + \{NG(fn) - Gfn\}^2} \quad (3)$$

When the resemblance coefficient signal NY is higher than the threshold value $NY_0$, an output signal is supplied from the comparator 39 to the AND gate 33. The AND gate 33 supplies the trigger pulse to an airbag driver circuit (not shown), when at least one of the two signals are supplied from the comparators 35 and 39 thereto, so that an airbag is inflated.

Figure 7:
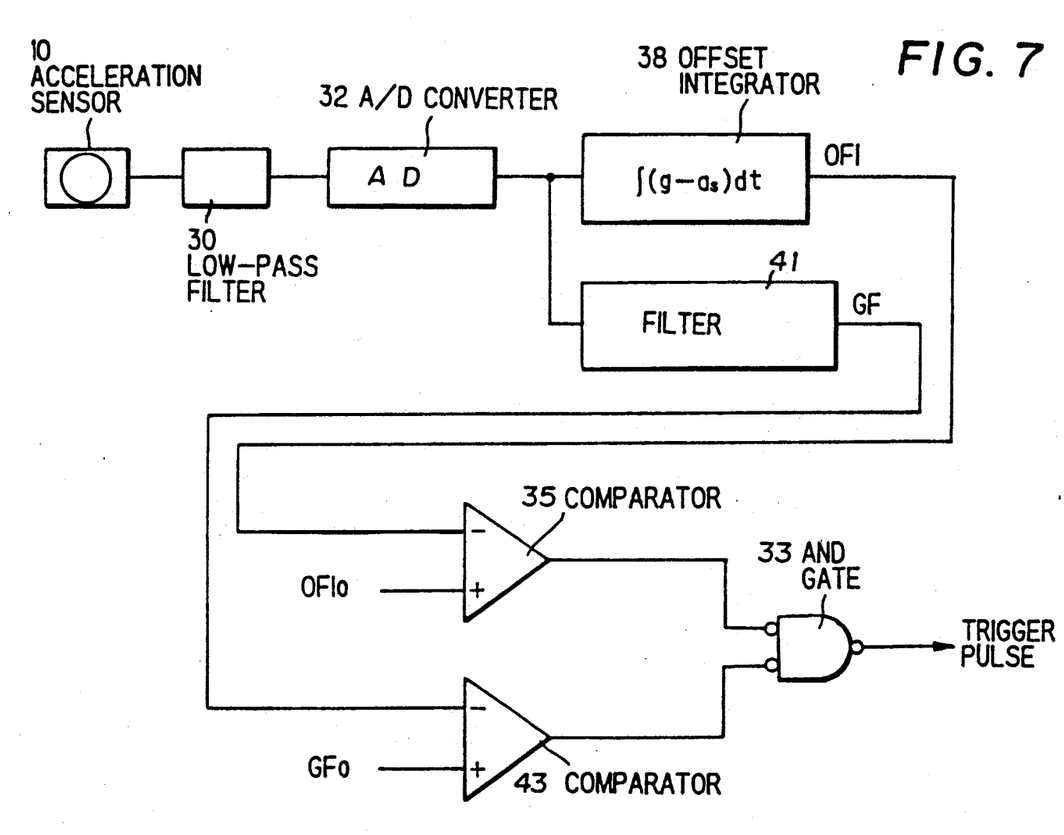
FIG. 7 is a block diagram showing a vehicle collision detecting apparatus of a second preferred embodiment according to the invention.

Next, a vehicle collision detecting apparatus of a second preferred embodiment according to the invention will be explained in conjunction with FIG. 7. This embodiment includes a filter 41 and a comparator 43 instead of the characteristic frequency extraction unit 31, the resemblance calculator 37 and the comparator 39 of the first preferred embodiment. Other components correspond with those of the first preferred embodiment, so that explanation of the corresponding structure is omitted in this embodiment.

According to the second preferred embodiment, a signal GF in a frequency band of 1 kHz of a acceleration signal "g" passes through the filter 41. The signal GF is supplied to the comparator 43, and is compared with a predetermined threshold value $GF_0$.

In this comparison, when the signal GF is higher than the threshold value $GF_0$, an output signal is supplied from the comparator 43 to an AND gate 33.

Figure 8:
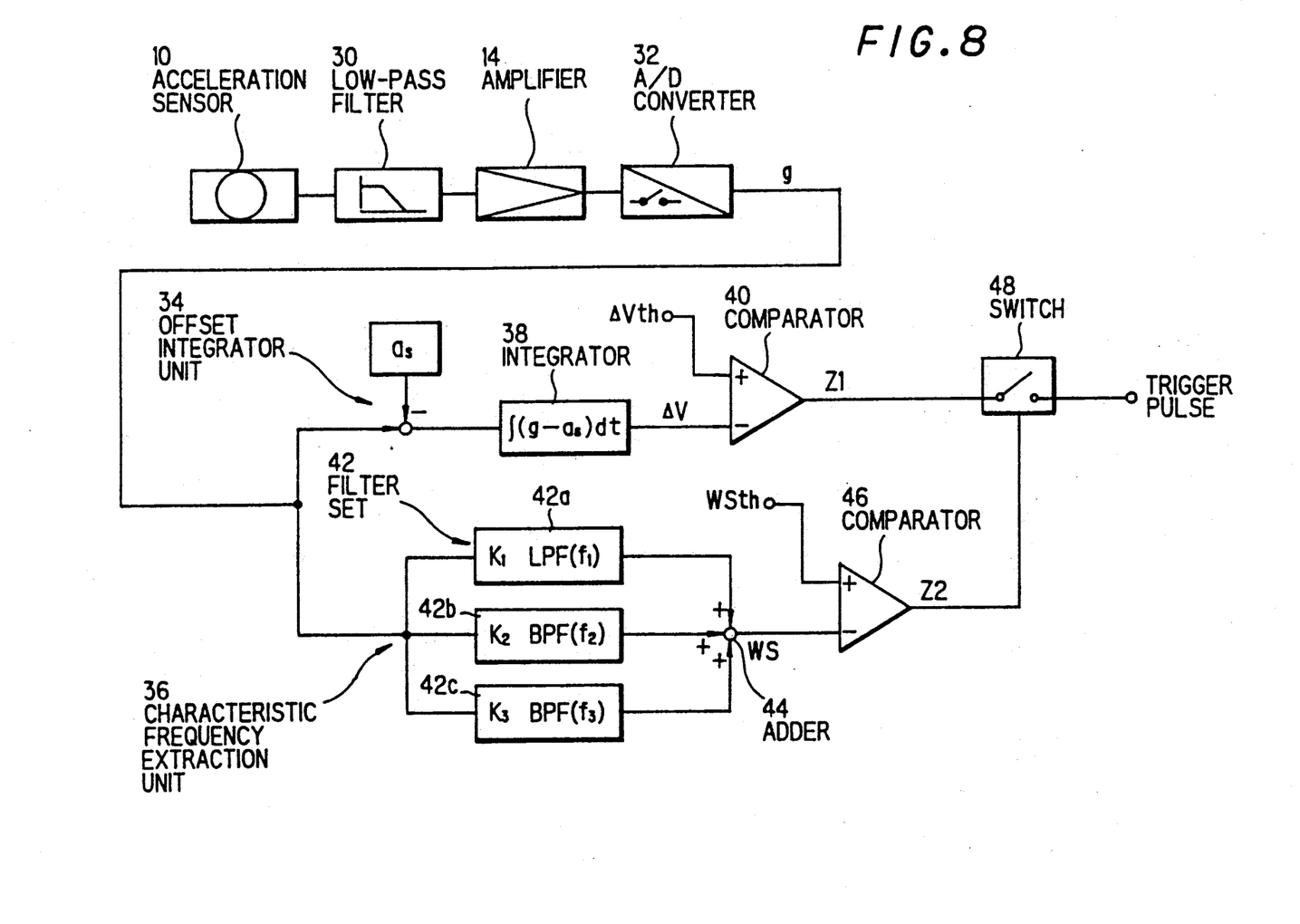
FIG. 8 is a block diagram showing a vehicle collision detecting apparatus of a third preferred embodiment according to the invention.

Next, a vehicle collision detecting apparatus of a third preferred embodiment according to the invention will be explained in conjunction with FIG. 8. A vehicle collision detecting apparatus includes an acceleration sensor 10 for detecting an acceleration of a motorcar, a low-pass filter 30 connected to the acceleration sensor 10, an amplifier 14 connected to the low-pass filter 30 for amplifying an acceleration signal, an analog to digital (A/D) converter 32 connected to the amplifier 14 for converting analog signal into digital signal "g", an offset integrator unit 34 (38 and 40) connected to the A/D converter 32, a characteristic frequency extraction unit 36 (42, 44 and 46) connected to the A/D converter 32 in parallel with the offset integrator unit 34, and a switch 48 connected to outputs of the offset integrator unit 34 and the characteristic frequency extraction unit 36, respectively.

The offset integrator unit 34 is composed of a integrator 38 for calculating an integrated signal $\Delta V$ in accordance with the below expression (4), and a comparator 40 for comparing the integrated signal $\Delta V$ with a predetermined threshold value $\Delta V_{th}$ calculated based on experimental data.

$$\Delta V = \int (g - a6) dt \quad \Delta V \geq 0 \quad (4)$$

In this expression, "a6" is an offset which is a maximum acceleration on a normal driving condition.

The comparator 40 supplies a signal Z1 to the switch 48, when the integrated signal $\Delta V$ is higher than the threshold value $\Delta V_{th}$. The characteristic frequency extraction unit 36 is composed of a filter set 42, an adder 44 for combining output signals of the filter set 42, and a comparator 46 for comparing an output signal WS of the adder 44 with a predetermined threshold value $WS_{th}$. The output signal WS of the adder 44 is calculated by the below expression (5).

$$WS = (k1 \times f1) + (k2 \times f2) + (k3 \times f3) \quad (5)$$

In this expression, k1, k2 and k3 are coefficients calculated based on experimental data, and f1=10 Hz, f2=400 Hz and f3=1000 Hz.

The comparator 46 supplies an output signal Z2 to the switch 48, when the signal WS is higher than the threshold value $WS_{th}$. The filter set 42 is composed of a low-pass filter 42a through which only a low frequency band signal (10 Hz±10 Hz) passes, a band pass filter 42b through which only a middle frequency band signal (400 Hz±200 Hz) passes, and a band pass filter 42c through which only a high frequency band signal (1000 Hz±200 Hz) 42c passes.

The switch 48, which is an AND gate, supplies a trigger pulse to an airbag driver circuit (not shown), when both of the signals Z1 and Z2 are supplied thereto.

Figure 9:
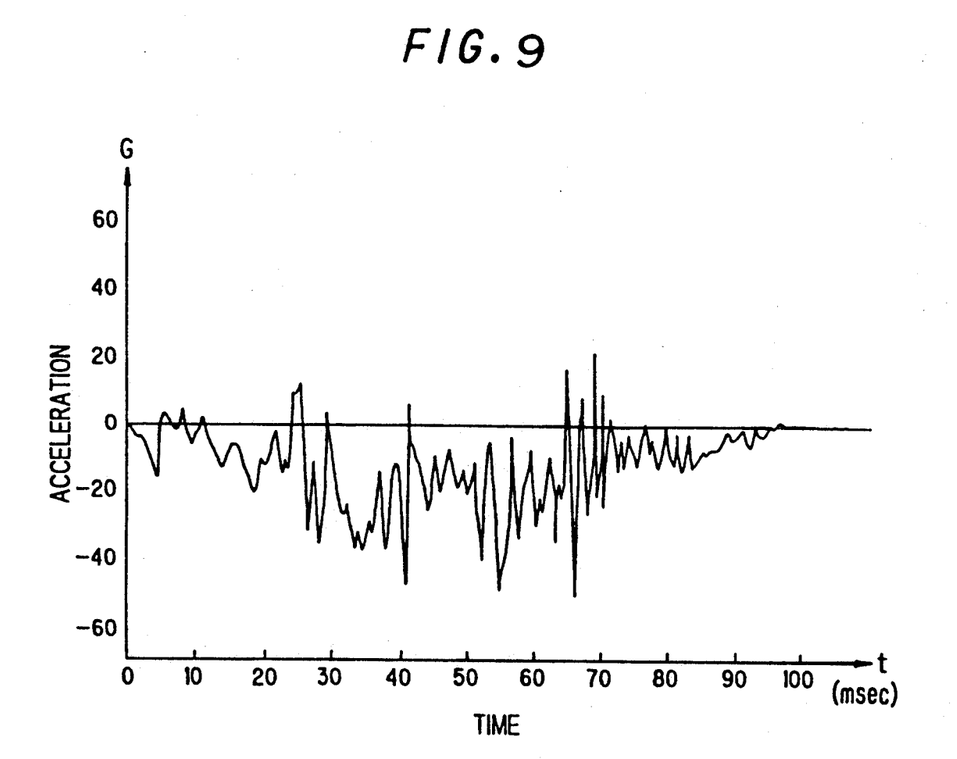
FIGS. 9 to 11 are graphs showing operation of the third preferred embodiment, respectively.
Figure 10:
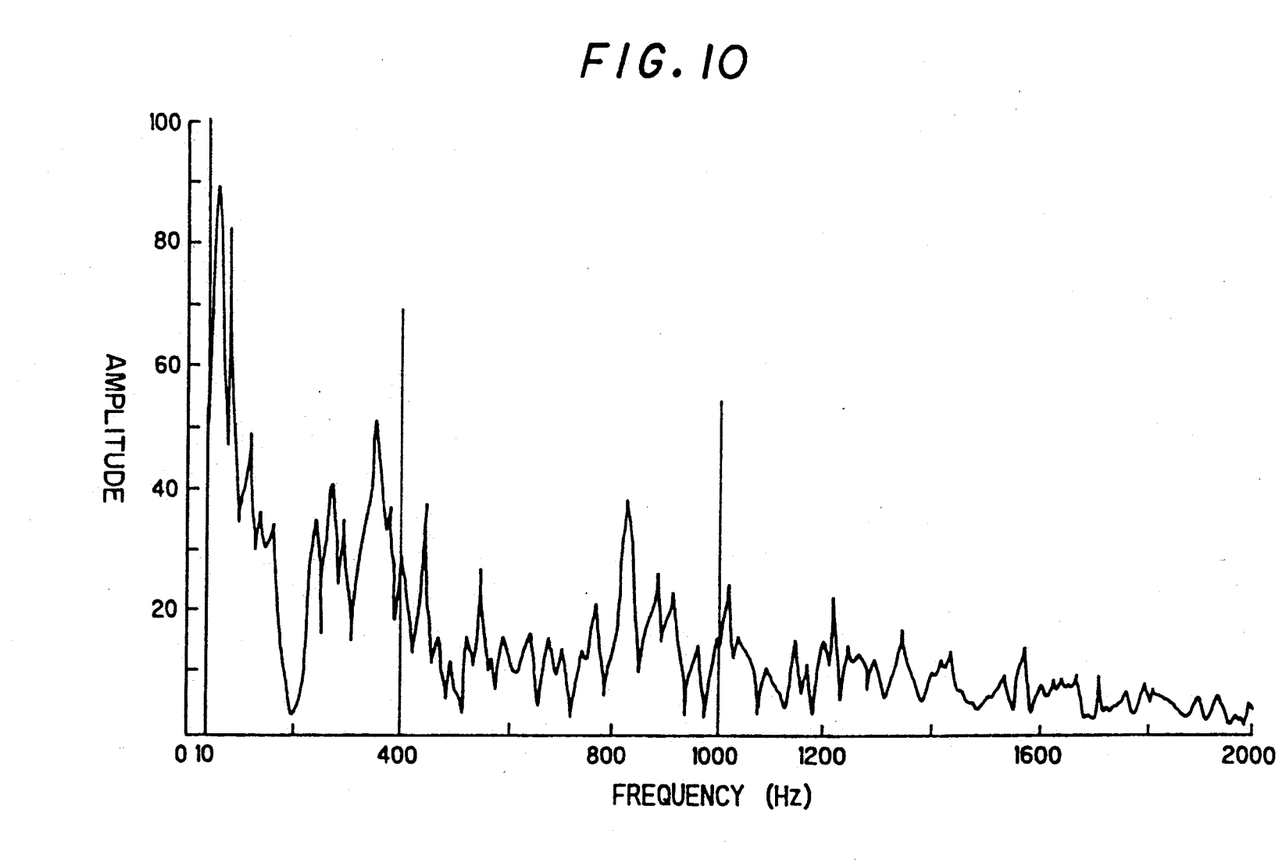

In operation, when a motorcar is driven, acceleration of the motorcar is detected by the acceleration sensor 10, and the detected signal "g" is supplied to the offset integrator unit 34 and the characteristic frequency extraction unit 36 through the low-pass filter 30, the amplitude 14 and the A/D converter 32. FIGS. 9 and 10 show a level of the detected acceleration relative to time and a spectrum (a relation between frequency and amplitude) of the acceleration signal, respectively.

Next, in the offset integrated unit 34, when the integrated signal $\Delta V$ is higher than the threshold value $\Delta V_{th}$, the signal Z1 is supplied to the switch 48.

Figure 11:
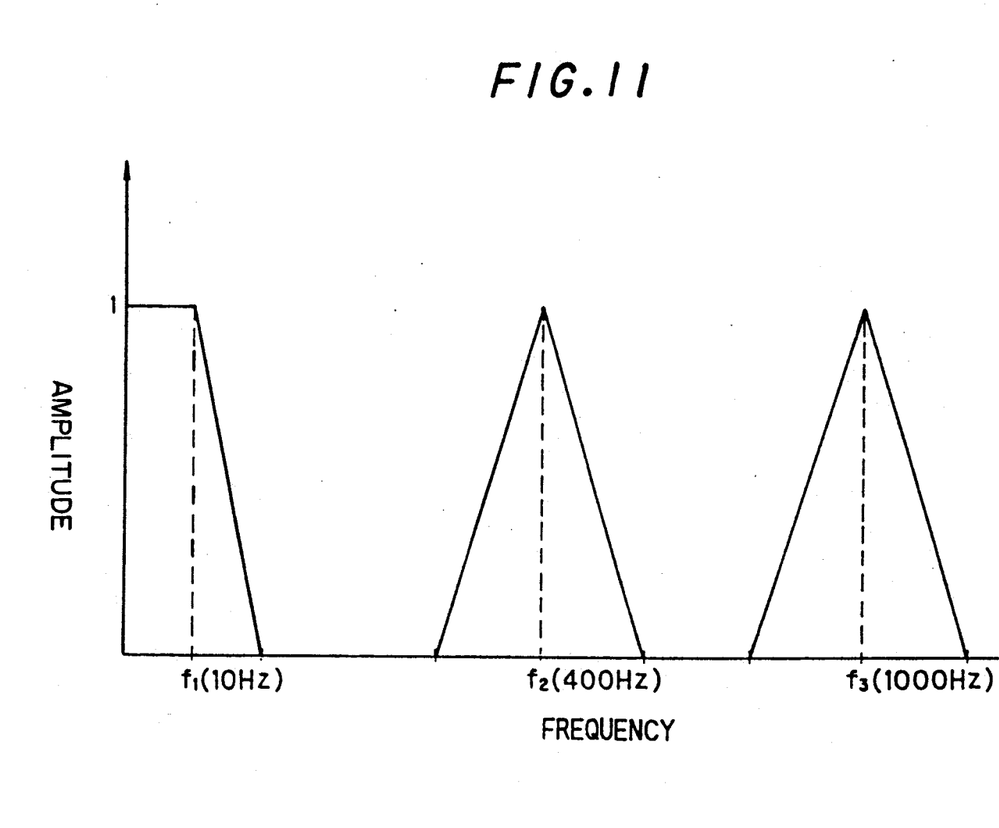

On the other hand, in the characteristic frequency extraction unit 36, the characteristic frequencies of the acceleration signal "g" are extracted by the filter set 42 as shown in FIG. 11, and the extracted signals are combined by the adder 44. At this time, when the added signal WS is higher than the threshold value $WS_{th}$, the signal Z2 is supplied to the switch 48.

When both signals Z1 and Z2 are supplied to the switch 48, the trigger pulse is supplied to the airbag driver circuit, so that an airbag (not shown) is inflated.

Figure 12:
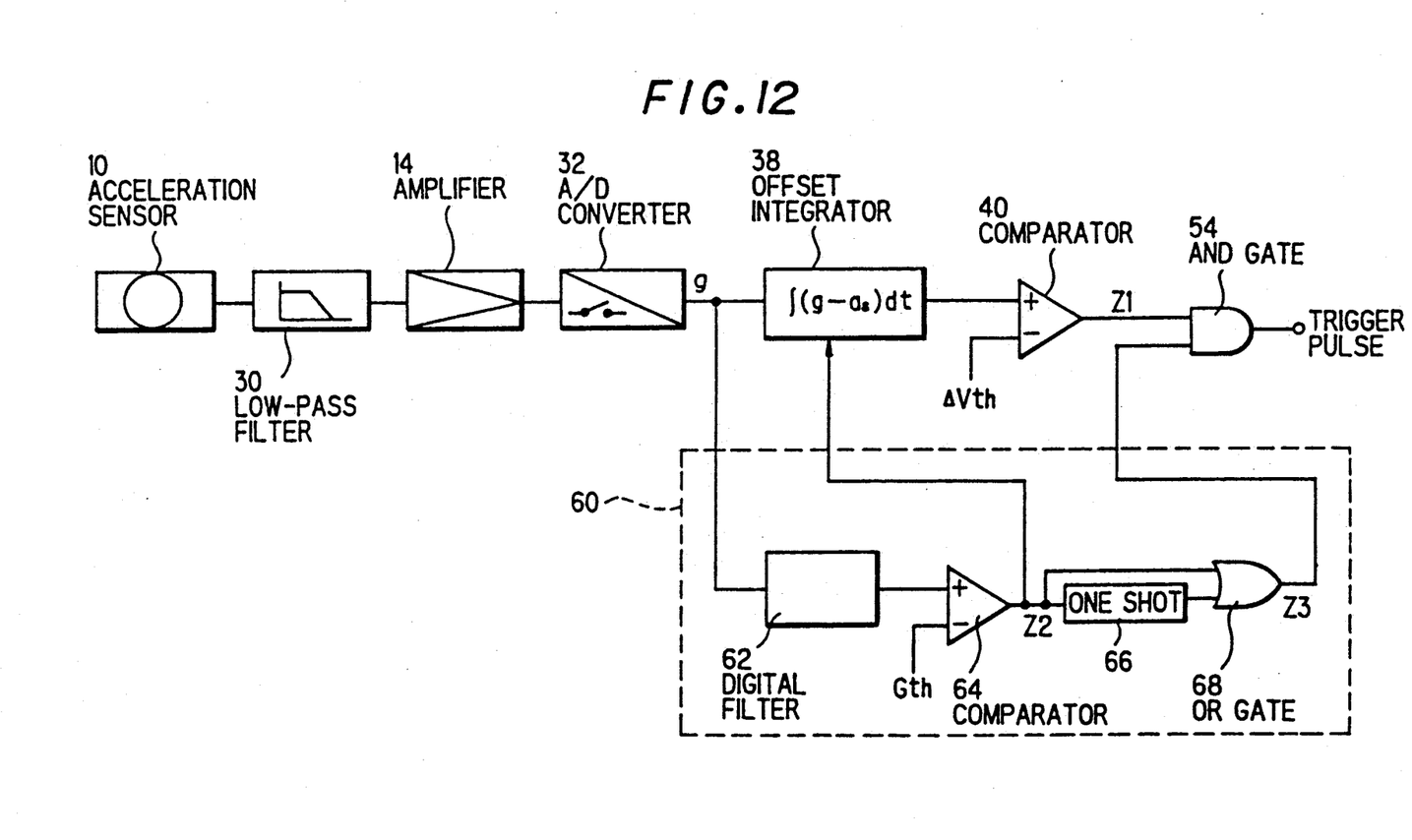
FIG. 12 is a block diagram showing a vehicle collision detecting apparatus of a fourth preferred embodiment according to the invention.

Next, a vehicle collision detecting apparatus of a fourth preferred embodiment according to the invention will be explained in conjunction with FIG. 12. In this embodiment, detailed explanation of the same structure and operation as the second preferred embodiment shown in FIG. 8 is omitted.

A vehicle collision detecting apparatus includes an acceleration sensor 10, a low-pass filter 30, an amplifier 14, an analog to digital (A/D) converter 32, an offset integrator 38, a comparator 40, an averaging unit 60 and an AND gate 54.

The averaging unit 60 is composed of a digital filter 62 composed of a primary differential filter connected to the A/D converter 32, a comparator 64 connected at one of inputs to the digital filter 62 and at an output to the offset integrator 38, a one shot circuit 66 connected to the comparator 64, and an OR gate 68 connected at inputs to the comparator 64 and the one shot circuit 66. The digital filter 62 averages an acceleration signal "g", that is, the digital filter 62 extracts a signal of a frequency less than 100 Hz from the acceleration signal "g". The comparator 64 compares an averaged signal $\Delta$ G with a predetermined threshold value $G_{th}$ and supplies an output signal Z2 when the averaged signal $\Delta$ G is higher than the threshold value $G_{th}$. The one shot circuit 66 maintains the OR gate 68 to supply an output signal Z3 of high level. The AND gate 54 supplies a trigger pulse to an airbag driver circuit (not shown), when both of the signals Z1 and Z3 are supplied thereto.

Figure 13:
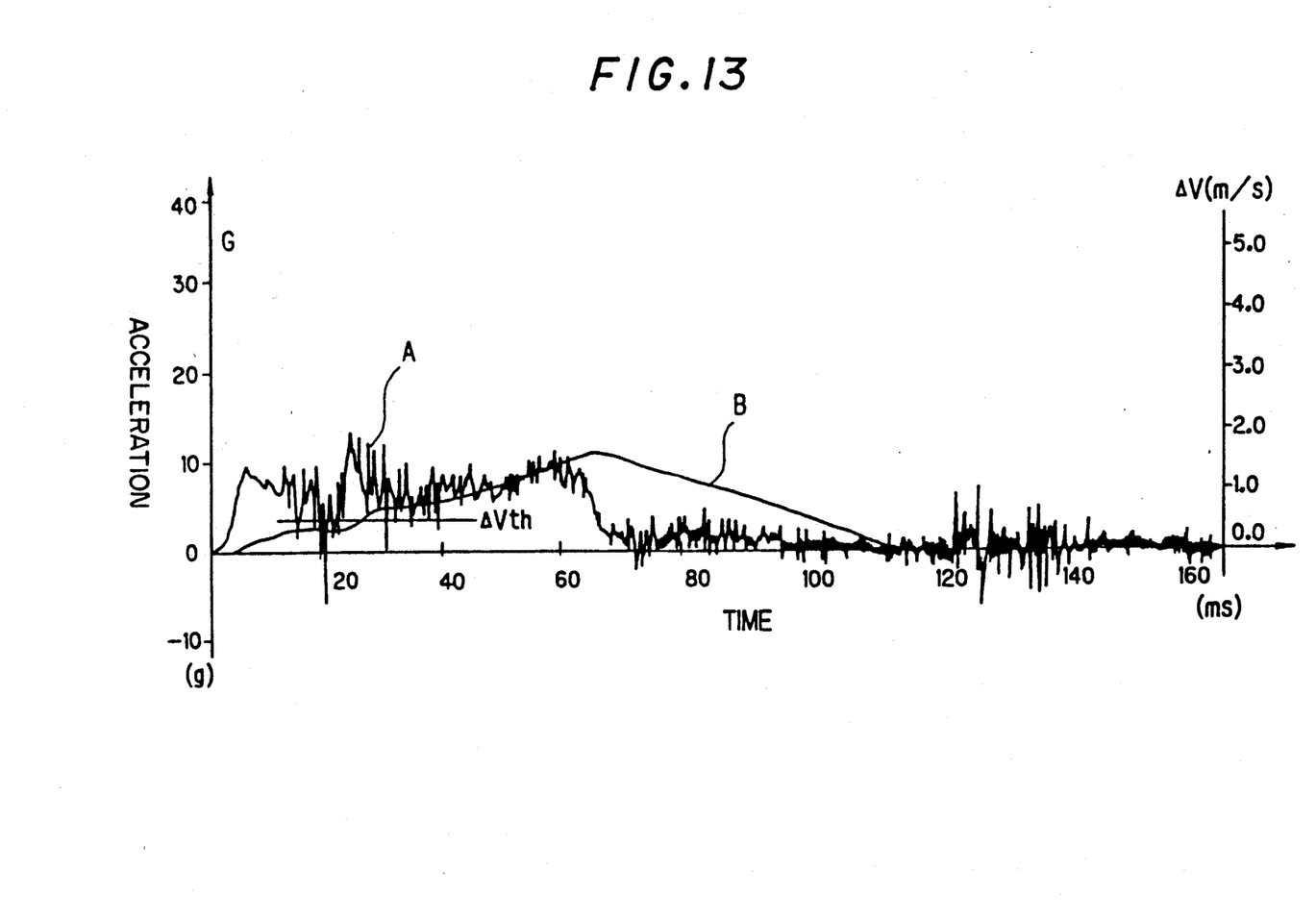
FIGS. 13 and 14 are graphs showing operation of the fourth preferred embodiment, respectively.

In operation, when the motorcar is driven, the acceleration signal "g" is detected by the acceleration sensor 10 as shown by a curve A in FIG. 13. The acceleration signal "g" is supplied to the offset integrator 38 and the averaging unit 60.

Figure 14:
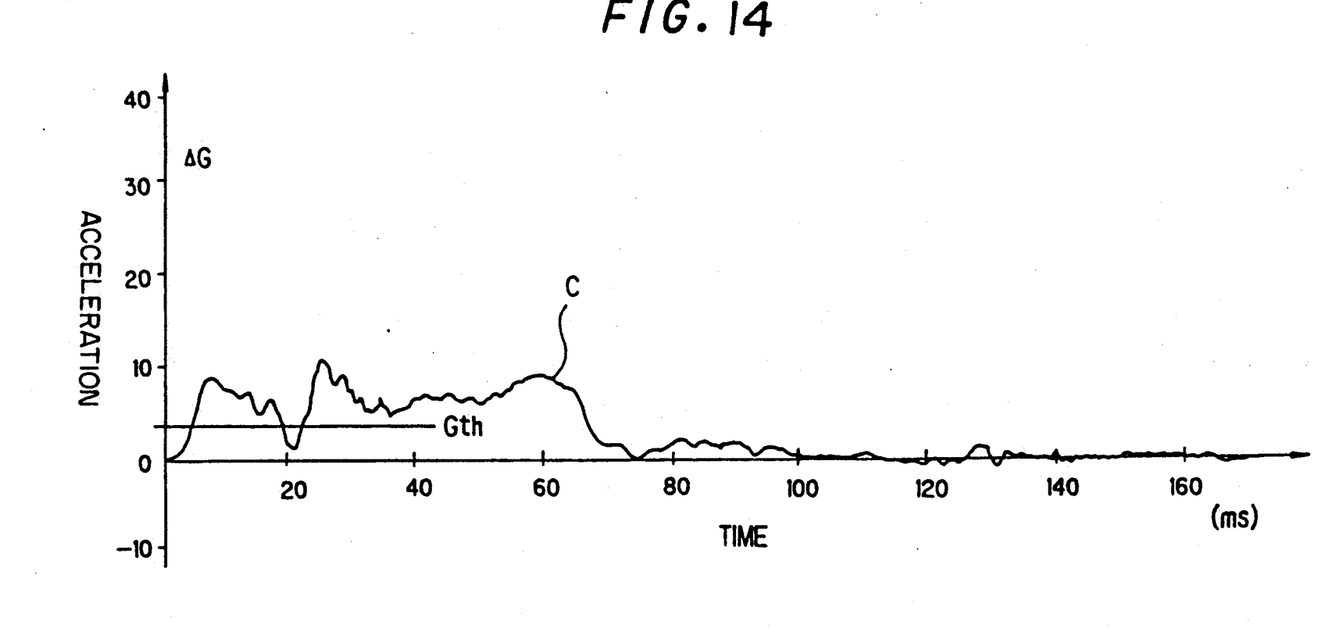

In the averaging unit 60, the acceleration signal "g" is averaged by the digital filter 62 as shown by a curve C in FIG. 14. Next, the averaged signal $\Delta$ G is compared with the threshold value $G_{th}$, and if the averaged $\Delta$ G signal is higher than the threshold value $G_{th}$, the signal Z2 is supplied to the offset integrator 38 and the one shot circuit 66. In response to the signal Z2, the acceleration signal "g" is integrated by the offset integrator 38 as shown by a curve B in FIG. 13. Next, the integrated signal $\Delta$ V is compared with the threshold value $\Delta V_{th}$ by the comparator 40. At this time, if the integrated signal $\Delta$ V is higher than the threshold value $\Delta V_{th}$, the signal Z1 is supplied to the AND gate 54.

On the other hand, the signal Z3 is supplied from the OR gate 68 to the AND gate 54 in response to the signal Z2. Therefore, a collision of the motorcar is detected, so that the trigger pulse is supplied from the AND gate 54 to the airbag driver circuit.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A vehicle collision detecting apparatus, comprising:

means for detecting acceleration of a vehicle;

means for integrating an output signal of said acceleration detecting means;

a first comparator for comparing an output signal of said integrating means with a predetermined threshold value;

means for extracting a signal in a predetermined frequency band from said output signal of said acceleration detecting means;

a second comparator for comparing an output signal of said extracting means with a predetermined threshold value; and means for detecting a collision in accordance with output signals of said first and second comparators.

2. A vehicle collision detecting apparatus, according to claim 1;

wherein said frequency extracting means comprises at least two filters through which signals in predetermined frequency bands pass, respectively, and means for combining said signals passing through said filters to supply an output signal to said collision detecting means.

3. A vehicle collision detecting apparatus, according to claim 2:

wherein said at least two filters consist of three kinds of filters through which signals of around 10 Hz, of around 400 Hz, and of around 1000 Hz pass, respectively.

4. A vehicle collision detecting apparatus, according to claim 1:

wherein said frequency extracting means is a filter through which said acceleration signal in a frequency band exerting some influence to the human body passes.

5. A vehicle collision detecting apparatus, according to claim 4:

wherein said frequency band is less than 100 Hz.

* * * * *